May 26, 1964

C. O. GLASGOW 3,134,612

GASKET RING FOR PIPE COUPLINGS

Filed Feb. 12, 1962

INVENTOR.
CLARENCE O. GLASGOW
BY
Dunlap, Laney & Hubbard
ATTORNEYS

United States Patent Office 3,134,612
Patented May 26, 1964

3,134,612
GASKET RING FOR PIPE COUPLINGS
Clarence O. Glasgow, 2620 S. Yorktown, Tulsa, Okla.
Filed Feb. 12, 1962, Ser. No. 172,442
1 Claim. (Cl. 285—112)

The present invention relates to pipe joints, and more particularly, but not by way of limitation, relates to an improved gasket ring for a pipe coupling of the type having two semicircular housing segments which interconnect the ends of two joints of pipe each having an annular groove cut therein.

As is well known in the art, pipe couplings for interconnecting the ends of two joints of pipe having only a circumferential groove cut therein are presently in extensive use, particularly in the oil industry. Each pipe coupling is comprised of two semicircular housing segments which are tightly clamped around the adjacent ends of two joints of pipe by two bolts. The housing segments have circumferential internal grooves therein for receiving a gasket ring which is then disposed between the housing segments and the pipe and spans the space between the adjacent ends of the pipe. The housing segments also have inwardly projecting, circumferential shoulders on either side of the gasket groove which, when the housing segments are clamped tightly around the pipe by the bolts, extend into the circumferential grooves which have been cut in the exterior surface of the joints of pipe adjacent the ends thereof. The shoulder and groove combination then provides a mechanical coupling between the two joints of pipe. The small space left between the adjacent ends of the two joints of pipe is covered and sealed by the gasket ring to provide a fluidtight coupling.

Two types of gasket rings are presently employed in this type of coupling. One type of gasket ring utilizes the pressure of the fluid within the pipe to accomplish a fluid seal, and the other type utilizes the housing segments to compress the gasket ring against the pipe.

The type of gasket ring which utilizes the fluid pressure for sealing is usually comprised of a ring of gasket material having a uniform cross section. The cross section may be characterized as having an open center portion which forms two annular lips, which lips are in circumferential engagement with the exterior surface of the two pipes. The two annular sealing lips extend one toward the other and are disposed on opposite sides of the space between the ends of the two joints of pipe such that fluid will pass between the ends of the joints of pipe into the open center portion of the gasket ring. The fluid pressure in the open center portion will then force the circumferential sealing lips into engagement with the respective pipe to prefect a fluid seal.

This type gasket ring operates satisfactorily under many, less severe, operating conditions. However, since this type of gasket ring is dependent upon internal pressure to effect sealing, the gasket will not provide an effective seal when the pressure is greater outside than atmospheric pressure from the interior of inside the pipe, such as when a partial vacuum is present within the pipe. Also, fluctuations of the pressure within the pipe from greater than to less than atmospheric pressure causes a flexing of the gasket ring due to the atmospheric pressure within the housing segments, and the flexing increases the rate of deterioration of the gasket.

But an even greater objection to the type of gasket ring which utilizes fluid pressure to effect a seal is that it creates a cavity between the ends of the pipe and outside the pipe in which a pocket of virtually stagnant fluid collects which greatly accelerates the rate of corrosion of the ends of the joints of pipe. This factor is exceedingly important when corrosive fluids are being transported by the pipe, such as in the case where the pipe is being used to transport the mixture of water and oil which is produced by so-called "water-flooding" secondary recovery methods in the oil producing industry. In many cases, it is desirable to interconnect two joints of pipe which have been internally coated with a suitable protective synthetic resin to reduce corrosion. In such a case, the pipe is usually internally coated at a plant before installation in the field. Frequently, the ends of the pipe are not uniformly coated, and are virtually never coated on the exterior surface, so that any corrosive fluid which comes in contact with the ends or the exterior surface adjacent the ends of the pipe will rapidly corrode or rust the metal of the pipe. Further, in most cases it is necessary to cut the previously coated pipe to various lengths for installation. As a practical matter, cutting of the pipe to the special lengths can only be accomplished in the field where no facilities are available to coat the newly cut ends of the pipe with the protective coating. In any event, the highly corrosive fluid being carried by the pipe at all times has access to the space between the adjacent ends of the pipe, and has access to a small portion of the exterior surface of the pipe adjacent the ends thereof. Also, when the pressure within the open center portion of the gasket ring is low, the fluid tends to pass between the sealing lips and the pipe, perhaps by capillary attraction, and promote corrosion of the exterior surface of the pipe beneath the sealing lips.

The compression type gasket ring functions on the principle that the thickness of the gasket ring is greater than the depth of the circumferential groove formed by the two housing segments. Therefore, when the housing segments are tightly clamped around the pipe by the bolts, the gasket ring will be pressed tightly against the exterior surface of the joints of pipe and will span the space between the ends of the joints of pipe to effect a circumferential fluid seal. This type of sealing gasket will effectively seal a pressure within the pipe below atmospheric pressure, or vacuum, but usually will not effectively seal relatively high pressure within the pipe, because sealing is dependent entirely upon the force with which the gasket ring is pressed against the pipe by the housing segments.

The compression type gasket ring usually is provided with an annular recess in the interior surface of the ring which is disposed immediately adjacent the space between the ends of the two pipe joints. The fluid in the pipe therefore not only has easy access to the space between the ends of the pipe, but also to the outer surface area of the pipe immediately adjacent the ends thereof. Of course, the rate of corrosion is thereby greatly accelerated as discussed above.

Therefore, it is contemplated by the present invention to provide an improved gasket ring for a pipe coupling of the type described which utilizes both compression of the ring gasket by the housing and the pressure of the fluid within the pipe to effectively seal either high pressures or vacuums within the pipe, and also which substantially fills both the annular groove formed by the housing segments and the annular space between the adjacent ends of the two joints of pipe, such that the ends of the joints of pipe are protected from the corrosive effects of the fluid flowing therethrough.

Therefore, it is an important object of the present invention to provide a gasket ring for use in combination with a pipe coupling of the type described which will more effectively seal high pressures within the pipe.

Another object of this invention is to provide a gasket ring of the type described which will effectively seal atmospheric pressure from entering the pipe when the pressure within the pipe is a partial vacuum.

Still another object of this invention is to provide a gasket ring of the type described which will not be subject to flexure by variations in the pressure within the pipe above and below the pressure without the pipe and, which will therefore have a longer life.

Another very important object of the present invention is to provide a gasket ring of the type described which will effectively retard corrosion of the adjacent ends of the two joints of pipe being connected together by the coupling.

Many additional objects and advantages will be evident to those skilled in the art from the following detailed description and drawings, wherein.

Figure 2:
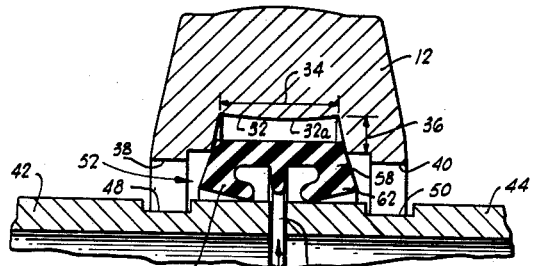
FIG. 2 is a sectional view taken on a radial plane or substantially on lines 2—2 of FIG. 1, showing a gasket ring constructed in accordance with the present invention before the clamp housing is clamped around the gasket ring and around the ends of the pipe joints by bolts.
Figure 4:
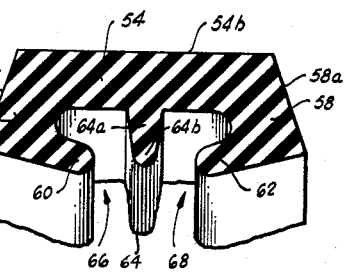
Figure 3:
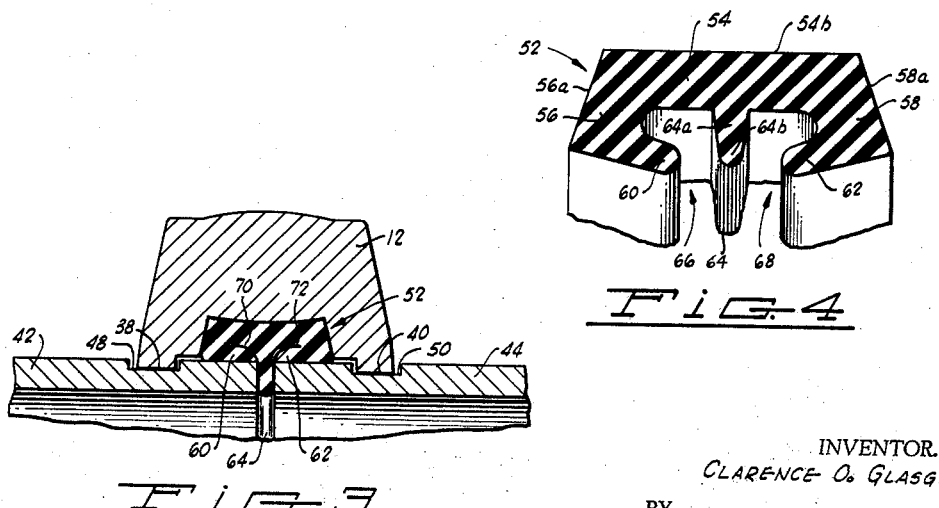

FIG. 3 is a radial sectional view substantially as shown in FIG. 2, but showing the clamp housing drawn tightly around the ends of the joints of pipe, and showing the gasket ring constructed in accordance with the present invention compressed into operative position; and FIG. 4 is a perspective view of a segment of the gasket ring constructed in accordance with the present invention before the gasket ring is compressed into operative position.

Figure 1:
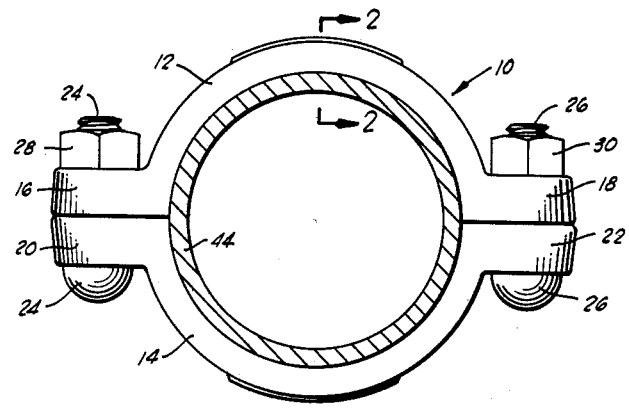
FIG. 1 is a side view of a pipe coupling of the type used in combination with a gasket ring constructed in accordance with the present invention, the pipe coupling being operatively connected to a joint of pipe which is shown in cross section.

Referring now to the drawings, and in particular to FIG. 1, a conventional pipe coupling is indicated generally by the reference numeral 10. The pipe coupling 10 is comprised of two semicircular housing segments 12 and 14 which are conventionally of identical construction. The housing segment 12 has a pair of ears 16 and 18, and the housing segment 14 has corresponding ears 20 and 22. A bolt 24 extends through apertures (not shown) in the ears 16 and 20, and a bolt 26 extends through corresponding apertures (not shown) in the ears 18 and 22. The two housing segments 12 and 14 may then be clamped tightly around the adjacent ends of two joints of pipe, hereafter referred to in greater detail, by nuts 28 and 30 which are threaded onto the bolts 24 and 26, respectively.

A typical radial section of the housing segment 12, which of course corresponds to a radial section of the housing segment 14, is shown in FIG. 2. The housing segment 12 has an annular groove, indicated generally by the reference numeral 32, which has a width 34 and a depth 36. Of course, it is apparent that the groove 32 extends around the entire semicircumference of the housing segment 12, and in conjunction with a similar groove (not shown) in the housing segment 14 forms a continuous annular groove in the housing which faces inwardly toward the pipe to be coupled. The housing segment 12 also has inwardly projecting annular shoulders 38 and 40 which are disposed on each side of the groove 32.

A portion of the adjacent ends of two joints of pipe 42 and 44 which are to be joined together are shown in cross section in FIG. 2. It will be noted that the adjacent ends of the pipe joints 42 and 44 are spaced apart a short distance to form a circumferential space or gap 46 (see FIG. 2). A circumferential groove 48 is cut in the outer surface of the pipe 42 a short distance from the end of the joint. A similar groove 50 is cut in the pipe joint 44. The grooves 48 and 50 are so disposed that when the pipe joints 42 and 44 are axially aligned substantially as shown, the grooves 48 and 50 will receive the annular shoulders 38 and 40 of the housing segments 12 and 14, substantially as shown in FIG. 3. The shoulders 38 and 40 preferably contact the bottoms of the grooves 48 and 50, respectively, to provide a rigid mechanical interconnection of the two joints of pipe 42 and 44.

An annular gasket ring constructed in accordance with the present invention is indicated generally by the reference numeral 52. The gasket ring 52 is preferably an integrally molded ring of resilient gasket material, such as rubber, sized to be slipped over the ends of the joints of pipe 42 and 44. The gasket ring 52 is characterized, when uncompressed by the housing segments 12 and 14 as hereafter described, by having a uniform cross section taken on a plane projected radially from the axis of the pipe joint substantially as shown in FIGS. 2 and 4. When compressed by the housing segments 12 and 14, the gasket ring 52 assumes a uniform radial section substantially as shown in FIG. 3, as will hereafter be described in greater detail.

Referring now to FIGS. 2 and 4, the gasket ring 52 is characterized by an annular web portion 54 which is of approximately the same width as the width 34 of the groove 32. Annular flange portions 56 and 58 extend radially inwardly from the edges of the web portion 54 toward the center of the gasket ring 52. The sides 56a and 58a of the annular flange portions 56 and 58 have a length which is slightly greater than the depth 36 of the groove 32. An annular sealing lip portion 60 extends inwardly from the flange 56 generally parallel to the web 54 toward the longitudinal center of the gasket ring 52. An identical annular sealing lip 62 also extends inwardly from the flange 58 and is disposed generally parallel to the web portion 54. An annular center flange portion 64 projects radially inwardly from the center of the annular web portion 54.

The particular uncompressed sectional configuration of the gasket ring 52 as shown in FIGS. 2 and 4 results somewhat from practical considerations in designing a mold for molding the gasket ring 52 in a single, integral piece. By way of example only, the outer taper of the sides 56a and 58a of the flange portions 56 and 58, respectively, may assist in removing the gasket ring 52 from the outer mold. Similarly, the sealing lips 60 and 62 are canted slightly toward the center of the gasket ring so that the portion of the molding dies which forms the open center portions 66 and 68 may be more easily withdrawn. Also, the taper of the annular center flange 64 assists in removing the gasket ring from the molding dies. However, these configurations of the cross section of the gasket ring 52 are also highly desirable in that they contribute to the effective operation of the gasket, as will be hereafter described.

The total sectional area, and therefore the total volume of the annular web portion 54, the two annular flange portions 56 and 58, and the two annular sealing lip portions 60 and 62, together with the root portion 64a of the annular center flange portion 64 should be greater, when compressed as shown in FIG. 3, than the total sectional area, and therefore the total volume, of the annular groove 32. Further, it will be noted that the center flange portion 64 is preferably slightly tapered and the root portion 64a is preferably as wide as, or slightly wider than, the nominal or average width of the gap 46 between the adjacent ends of the joints of pipe 42 and 44. The innermost edge 64b of the inwardly projecting annular center flange portion 64 is sufficiently narrow as to be inserted in the gap 46 between the ends of the joints of pipe 42 and 44.

In order to apply the coupling 10 together with the novel gasket ring 52 to interconnect the ends of the two joints of grooved pipe 42 and 44, the gasket ring 52 is first slipped over the end of one of the joints of pipe, for example pipe joint 42. Next the other joint of pipe 44 is axially aligned with the first joint of pipe 42 and the gasket ring 52 slipped partially onto the end second joint of pipe 44 so as to span the gap 46 between the adjacent ends of the two joints of pipe. The housing segments 12 and 14 are then placed on opposite sides of the gasket 52, which results in a position substantially as shown in FIG. 2, and the bolts 24 and 26 inserted through the apertures in the ears 16 and 20, and 18 and 22, respectively. The nuts 28 and 30 are then threaded onto the bolts 24 and 26, respectively, and tightened until the shoulders 38 and 40 of both housing segments 12 and 14 abut against the bottom of the grooves 48 and 50, substantially as shown in FIG. 3. As the housing segments 12 and 14 are drawn together by tightening of the nuts 28 and 30, the flange portions 56 and 58, together with the lip portions 60 and 62, are forced inwardly as the edges of the groove 32 move down along the sides 56a and 58a of the flange portions. After the bottom 32a of the groove 32 contacts the outer surface 54b of the web 54, additional movement of the housing segments 12 and 14 together results in a compression of the annular flange portions 56 and 58. Simultaneously, the center flange portion 64 will be forced into the gap 46 between the adjacent ends of the pipe 42 and 44. By the time the housing segments 12 and 14 have been clamped tightly in the grooves 48 and 50, the combined volume of the annular web portion 54, the annular flange portions 56 and 58, and the annular sealing lip portions 60 and 62, together with the root portion 64a of the annular center flange portion 64, will totally fill the volume bounded generally by the groove 32 and the exterior surface of the ends of the pipe joints 42 and 44 such that the entire mass of material of the gasket ring will be subjected to bulk compression. Further, the center flange portion 64 will be forced into and in nearly all instances will completely fill the annular space or gap 46 between the adjacent ends of the pipe joints 42 and 44, substantially as shown in FIG. 3.

It will also be appreciated that the overall diameter of the gasket ring 52 will be reduced as the housing segments 12 and 14 are tightened against the pipe joints 42 and 44 as described. Therefore, it is necessary for the gasket ring 52 to undergo circumferential compression to the smaller diameter, which also results in an expansion or thickening of each of the various annular portions 54, 56, 58, 60 and 62 described above. This factor is particularly advantageous in regard to the annular center flange portion 64 which is inserted in the gap 46 between the ends of the pipe joints 42 and 44. As the diameter of the annular center flange portion 64 is reduced, circumferential compression tends to thicken or expand and press the sides of the annular center flange portion tightly against the ends of the pipe joints 42 and 44.

Therefore, it will be noted that the entire volume of the gasket ring 52 which is retained within the groove 32 by the pipe joints 42 and 44 is subjected to considerable compression such that the sealing lips 60 and 62 will be forced securely against the exterior surface of the pipe joints 42 and 44, respectively. Any volume of the gasket ring 52 in excess of the volume of the groove 32 will flow toward the gap 46 between the ends of the pipe joints 42 and 44, and will force the projecting center flange portion 64 farther into the gap 46 between the ends of the pipe joints. As the inwardly directed center flange portion 64 is forced farther into the space between the ends of the pipe joints, the innermost diameter thereof is progressively decreased such that the innermost edge thereof is subjected to circumferential compression and expands into firm engagement with the ends of the pipe joints 42 and 44, as previously described. The center flange portion 64 will be pressed against the ends of the pipe joints 42 and 44 with sufficient force as to prevent fluid at lower pressures from entering into the gap 46 between the center flange portion 64 and the respective ends of the joints of pipe. The annular center flange portion 64 substantially eliminates all appreciable contact of corrosive fluids with the ends of the pipe joints and will in all cases eliminate the formation of stagnant pockets of fluid in the gap 46.

When the pressure of the fluid within the pipes exceeds the bulk pressure of the rubber of the gasket ring resulting from compression, the high pressure fluid may enter between the center flange portion 64 and the ends of the pipe joints and may pass upwardly into the slits between the sealing lip portions 60 and 62 and the web portion 54, which are formed from the open center portions 66 and 68 and are designated in FIG. 3 by the reference numerals 70 and 72, respectively. As the high pressure fluid forces its way into the slits 70 and 72 the fluid pressure will press the lip portions 60 and 62 against the outer circumference of the ends of the pipe joints 42 and 44, respectively, with increasing force to effectively seal a pressure of virtually any magnitude which may be encountered within the pipes 42 and 44.

Since the sealing lip portions 60 and 62 are pressed against the outer circumference of the pipe joints 42 and 44 by the force of compression exerted by the housing segments, the gasket ring 52 will effectively seal pressures outside of the pipe, such as atmospheric pressure, which may be greater than the pressure within the pipes so that a vacuum may be maintained within the pipe. In addition to the compressive sealing force acting on the sealing lips 60 and 62, it will be noted that when the pressure outside the pipes exceeds the pressure within the pipe, the pressure differential acting on the surface 54b of the web 54 will wedge the center flange portion 64 more tightly into the gap 46 between the ends of the pipe joints 42 and 44 to increase the sealing effect of the gasket ring 52. However, since the gasket ring 52 is already under substantial compression, any movement or flexure of the web portion 54 will not be detectable. Consequently, the web portion 54 will not be subjected to flexing when the pressure within the pipes 42 and 44 fluctuates first below and then above the pressure outside of the pipe, as has been the case in some gasket rings previously known in the art.

Therefore, it will be seen that the improved gasket ring 52 effectively seals pressures ranging from low vacuums to the highest that most standard pipe is capable of withstanding. Further, the gasket ring 52 is not subjected to any flexure which would tend to deteriorate the material from which it is fabricated. But even more important, the fact that the entire gasket ring is subjected to compression prevents any fluid from seeping between the gasket ring and the pipe which would promote corrosion. Stagnant pools of fluid within the gasket ring or between the ends of the pipe joints 42 and 44 are completely eliminated. Whether the adjacent ends of the pipe joints 42 and 44 have an imperfect protective coating, or have no protective coating at all, is of no appreciable consequence since the projecting center flange portion 64 prevents virtually any fluid from contacting the ends of the pipe joints, except for possible high pressure seepage which might form a very thin film between some parts of the flange portion 64 and the adjacent ends of the pipe joints 42 and 44. In any event, corrosion of the ends of the pipe joints 42 and 44 will be greatly retarded.

From the above detailed description, it will be evident that a new and novel gasket ring has been described and illustrated. However, it is to be understood that various changes and alterations can be made therein without departing from the spirit and scope of the invention as defined by the appended claim.

I claim:

An improved gasket ring for a pipe coupling having semicircular housing segments which, when clamped in operative position around the adjacent ends of two joints of pipe, form an annular groove having a width and a depth, said groove opening inwardly toward the pipe joints and being disposed over the adjacent ends thereof, which adjacent ends are spaced apart to form an annular gap, the improved gasket ring comprising:

an annular ring of resilient material having a uniform radial section, which radial section is characterized, when uncompressed by the housing segments by a web portion having a width corresponding substantially to the width of said annular groove at the deepest part of said annular groove;

a flange portion extending radially inwardly from each edge of said web portion, each of said flange portions having sides tapering away from each other with said sides terminating at inner edges spaced from each other by a distance greater than the width of the opening of said annular groove, said flange portions each having a length greater than the depth of said annular groove;

an inturned lip portion extending from the innermost edge of each of said flange portions, the inturned lip portions each being spaced from said web portion and extending generally parallel thereto; and an annular center flange portion secured to, and extending radially inwardly from, the center of said web portion in a line lying substantially equidistant from each of said inturned lip portions for alignment with said annular gap when said web portion straddles said annular gap, said center flange portion being generally wedge-shaped in configuration to facilitate compression of said center flange portion into said annular gap when said web portion is moved radially inwardly toward the ends of said pipe joints, and said annular center flange portion having a length as measured from said web portion to the free end of said annular center flange portion less than the distance from said web portion to the radially inner sides of said inturned lip portions when the gasket is in a relaxed condition, said length of the annular center flange portion being such that said annular center flange portion will extend into said annular gap when said housing segments are clamped in place to fully compress said gasket, the total volume of the web portion, the two flange portions, the two lip portions and the center flange portion being greater than the total volume of the annular groove in the housing segments, whereby when the housing segments are clamped tightly around the ends of the joints of pipe in operative position, the gasket ring will completely fill the annular groove and the center flange portion of the gasket will be forced into the annular gap between the adjacent ends of the two joints of pipe.

References Cited in the file of this patent
UNITED STATES PATENTS

| | | |
|---|---|---|
| 1,704,003 | Johnson | Mar. 5, 1929 |
| 2,184,376 | Beyer et al. | Dec. 26, 1939 |
| 2,449,795 | Stillwagon | Sept. 21, 1948 |
| 2,884,264 | Takeuchi | Apr. 28, 1959 |
| 2,949,325 | Nenzell | Aug. 16, 1960 |
| 3,084,959 | Stanton | Apr. 9, 1963 |

FOREIGN PATENTS

| | | |
|---|---|---|
| 318,163 | Great Britain | Aug. 26, 1929 |